United States Patent [19]
Walenta

[11] 4,264,816
[45] Apr. 28, 1981

[54] IONIZATION CHAMBER

[75] Inventor: Albert H. Walenta, Port Jefferson Station, N.Y.

[73] Assignee: The United States of America as represented by the United States Department of Energy, Washington, D.C.

[21] Appl. No.: 98,451

[22] Filed: Nov. 29, 1979

[51] Int. Cl.[3] .......................... G01T 1/18; H01J 47/00

[52] U.S. Cl. .................................... 250/374; 250/385; 313/93

[58] Field of Search ............... 250/374, 375, 385, 379; 313/93

[56] References Cited

U.S. PATENT DOCUMENTS

| | | | |
|---|---|---|---|
| 3,207,938 | 9/1965 | Anton | 250/374 |
| 3,585,003 | 6/1971 | Scolnick | 250/379 |
| 3,603,831 | 9/1971 | Kimmel | 250/379 |
| 3,786,270 | 1/1974 | Borkowski et al. | 250/374 |
| 3,911,279 | 10/1975 | Gilland et al. | 313/93 |

OTHER PUBLICATIONS

Walenta, A. H., "The Time Expansion Chamber and Single Ionization Cluster Measurement", *Proceedings of the IEEE Transactions on Nuclear Science, vol. NS-26, Feb. 1979, pp. 73–80.*

*Primary Examiner*—Alfred F. Smith
*Assistant Examiner*—Janice A. Howell
*Attorney, Agent, or Firm*—Cornell D. Cornish; Leonard Belkin; Richard G. Besha

[57] ABSTRACT

An ionization chamber has separate drift and detection regions electrically isolated from each other by a fine wire grid. A relatively weak electric field can be maintained in the drift region when the grid and another electrode in the chamber are connected to a high voltage source. A much stronger electric field can be provided in the detection region by connecting wire electrodes therein to another high voltage source. The detection region can thus be operated in a proportional mode when a suitable gas is contained in the chamber. High resolution output pulse waveforms are provided across a resistor connected to the detection region anode, after ionizing radiation enters the drift region and ionize the gas.

14 Claims, 3 Drawing Figures

IONIZATION CHAMBER

BACKGROUND OF THE INVENTION

A. Field of the Invention

The present invention relates generally to ionization chambers for detecting radiation emitted by radioactive material, and more particularly to an ionization chamber having a drift region and a detection region. The chamber is arranged to contain a suitable gas so that upon exposure to radiation, ionized electrons are produced which drift at at relatively low speed toward the detection region, and are thereafter accelerated and detected as in a proportional counter.

B. Discussion of the Prior Art

Various ionization chambers are known in the art, such chambers being used to detect the presence of fast moving particles associated with x-rays, gamma rays, neutrons, alpha particles, and the like. These chambers have many uses, such as in research and in nuclear instrumentation wherein the level of radiation intensity at a given point is to be measured.

Naturally, gas filled ionization chambers operate on the principle that when ionizing particles, which carry an electric charge, pass near the gas atoms they cause electrons of the atoms to be removed thereby ionizing the atoms. A static electric field is provided through the chambers so that the freed electrons are caused to drift along the direction of the field, and wire or plate electrodes located in the chamber then detect the presence of these electrons as they pass near or impinge on the electrodes. A resistor is connected to one of the electrodes, usually the anode, and a detection current induces a voltage drop across this resistor. The voltage drop is amplified to provide a pulse waveform which can be viewed on an oscilloscope, or otherwise processed by various waveform analyzing instruments. By analyzing the voltage waveforms produced, it is possible to determine the number of ionization electrons impinging on or passing near the detecting electrode over a given period of time. From this information, it is possible to determine physical properties of the particles within the chamber.

In the event an ionization chamber is used to detect ionization electrons produced by a single particle, it will be appreciated that the electrode current produced only by those ionization electrons freed by the particle will be quite small. Accordingly, an amplifier must be used to increase the voltage produced by this current across the electrode resistor. A larger pulse may be obtained if the ionization chamber is arranged to operate as a proportional counter. In such a case, the electric field is increased so that the ionization electrons initially freed by the particle are themselves accelerated sufficiently to cause further ionization as they pass near other gas atoms. As the field strength is increased up to a predetermined value, the output pulse waveform will be directly proportional to the original ionization of the gas as caused by the particle alone. Thus, the proportional counter uses gas multiplication as a linear amplifying device.

Problems have arisen, however, in the use of proportional counters for determining physical properties of relativistic particles. For example, it has become common knowledge that with ionization chambers using multi-wire electrodes, the output pulse waveform changes as a function of the distance between the particle trajectory and the anode wire. The most pronounced changes are observed (for a particle trajectory perpendicular to the wire plane) when the particle passes at or very near the anode wire. The pulse rise time becomes slower since the ionization distributed along the trajectory arrives at the anode in a sequence corresponding to the drift time. If the chamber is not operated as a proportional counter, it was found that the particle position resolution for trajectories close to the anode is unsatisfactory. This effect has been explained by the stochastic nature of the ionization which defines a number of ionization clusters along the trajectory. If suitable instrumentation is used, the anode current is observed as showing a structure with several maxima which may be explained by the statistical fluctuation in the primary ionization.

It has been realized that counting the number of clusters would greatly improve high energy particle identification based on the relativistic rise of energy loss. This is because most of the relativistic rise of energy loss observed in an ionization chamber is primarily due to the increase of the number of collisions, and depends only slightly upon the change of energy loss in a single collision which corresponds to the amount of ionization in one cluster. This is responsible for large fluctuations in the energy loss measurement which therefore makes it difficult to measure the relativistic rise. Furthermore, the signal provided by the anode current for single clusters is not well resolved. Each peak of the signal still consists of several clusters, since the response of the counter to a single cluster is too slow (due to low drift velocity of positive ions) compared to the mean drift distance of the clusters in an ordinary proportional counter.

A proportional counter radiation camera is known, this camera being disclosed in U.S. Pat. No. 3,786,270 as having multi-wire electrodes arranged in a detecting region which is located next to a series of parallel spaced field plates or electrodes which provide a linear drift field. The purpose of the drift field is to provide a greater active gas volume and thereby increase the detection efficiency of the camera, according to the patent. Further, the electrodes are arranged to provide output pulses having amplitudes proportional to the position of a detected event across each of the electrodes so that an image of radiation which is directed perpendicularly to the plane of the electrodes can be recorded by appropriate two-dimensional recording means associated with the camera. There is no disclosure or suggestion in U.S. Pat. No. 3,786,270 of providing a drift field region wherein relativistic particles can enter along trajectories which extend in other than a perpendicular direction relative to the electrodes, and that signals can be provided by the electrodes which serve to identify a number of properties of the particles including their identity.

SUMMARY OF THE INVENTION

The ionization chamber of the present invention was developed to overcome the above and other problems with the prior chambers, and provide increased resolution basically by causing the mean drift time distance between ionization clusters to be large enough so that they can be distinguished in the chamber output signal, instead of trying to attain even shorter anode signals than previously obtained.

An object of the present invention is to overcome the shortcomings of the prior ionization chamber detectors.

Another object of the present invention is to provide an ionization chamber of relatively simple construction and readily available materials, but which nevertheless provides significantly high measurement sensitivity and resolution.

Yet another object of the present invention is to provide an ionization chamber which can be operated in a number of modes to enable detection of a number of ionization clusters or single electrons which are produced by ionizing radiation passing in any of a number of directions relative to the chamber electrodes, so that various properties concerning the particle can be determined.

Still another object of the present invention is to provide an ionization chamber wherein the radiation under investigation can be brought within drift and detection regions thereof by being included in the chamber gas or by being emitted through the chamber walls.

In accordance with the present invention, an ionization chamber includes a drift region and a detection region, and a grid defining a boundary between the drift and detection regions. The grid is also arranged to operate as a first field electrode for the drift region, and a second field electrode is located in the drift region and spaced apart from the grid to enable a drift field to be provided in the drift region when the first and second electrodes thereof are connected to a first external voltage source. Anode and cathode electrodes are provided in the detection region and spaced apart from each other so that a detecting field can be provided between the detecting electrodes when they are connected to a second external voltage source.

In the chamber of the present invention, the drift region is well isolated by the grid from the amplification or detection region, so that a relatively low electric field can be maintained in the drift region, while a relatively high field can be provided in the detection region. When using a suitable gas, the drift velocity in the drift region can be considerably lower than in the detection region, so that clusters of a track crossing the chamber substantially parallel to the direction of the drift field arrive at the detection region in time intervals larger than in an ordinary proportional counter type of chamber. Since the signal provided by the detecting anode has not been slowed down, a relative time expansion is achieved.

In order to resolve a spatial ionization distribution created by ionizing radiation in the chamber of the present invention, the following operating conditions should be observed.

(1) The formation of the anode signal must be fast, such response being obtainable by the use of a very thin anode wire (Δ μm. diameter, for example), and a relatively narrow gap for the detection region;

(2) The drift speed in the drift region must be substantially lower than in the detection region;

(3) The grid separating the drift and detection regions must be fine enough not to disturb the sequence of arriving ionization electrons; and (4) A suitable gas must be used such as to provide low drift speed in the drift region and high drift speed in the detection region. The gas should also not be susceptible to electron attachment.

The signals provided by detecting anode wires in the chamber may be processed in different ways depending upon the information desired concerning the chamber ionization. Three operational modes are possible with the chamber of the present invention, these modes being briefly described below.

In one mode, diffusion is kept at a relatively low level and an impulse or binary counter coupled to the detecting anode records the number of ionization clusters, thereby leading to identification of the relativistic particles in the chamber.

In a second mode, diffusion is relatively large and a high time expansion factor (i.e., ratio of detecting region speed to drift region speed) is provided. Single freed ionization electrons are then counted by way of an impulse counter, thereby leading to information concerning the total energy dissipated. This measurement is far more accurate than has been previously obtained by measurement of integrated pulse heights. Additionally, the use of a simple impulse counter for this measurement, instead of an instrument sensitive to slight amplitude variations, is advantageous.

In a third mode, the arrival time of clusters (including single electrons) is recorded upon measurement of additional coordinates in a manner well known for proportional type detectors, and the spatial distribution of the chamber ionization is reconstructed. This leads to the identification of the type of ionizing radiation (x-rays, gamma rays, neutrons or alpha particles, for example).

The above and other objects and features of the present invention will become more apparent from the following detailed description of preferred embodiments when read in conjunction with the accompanying drawings.

DETAILED DESCRIPTION OF THE INVENTION

Figure 1:
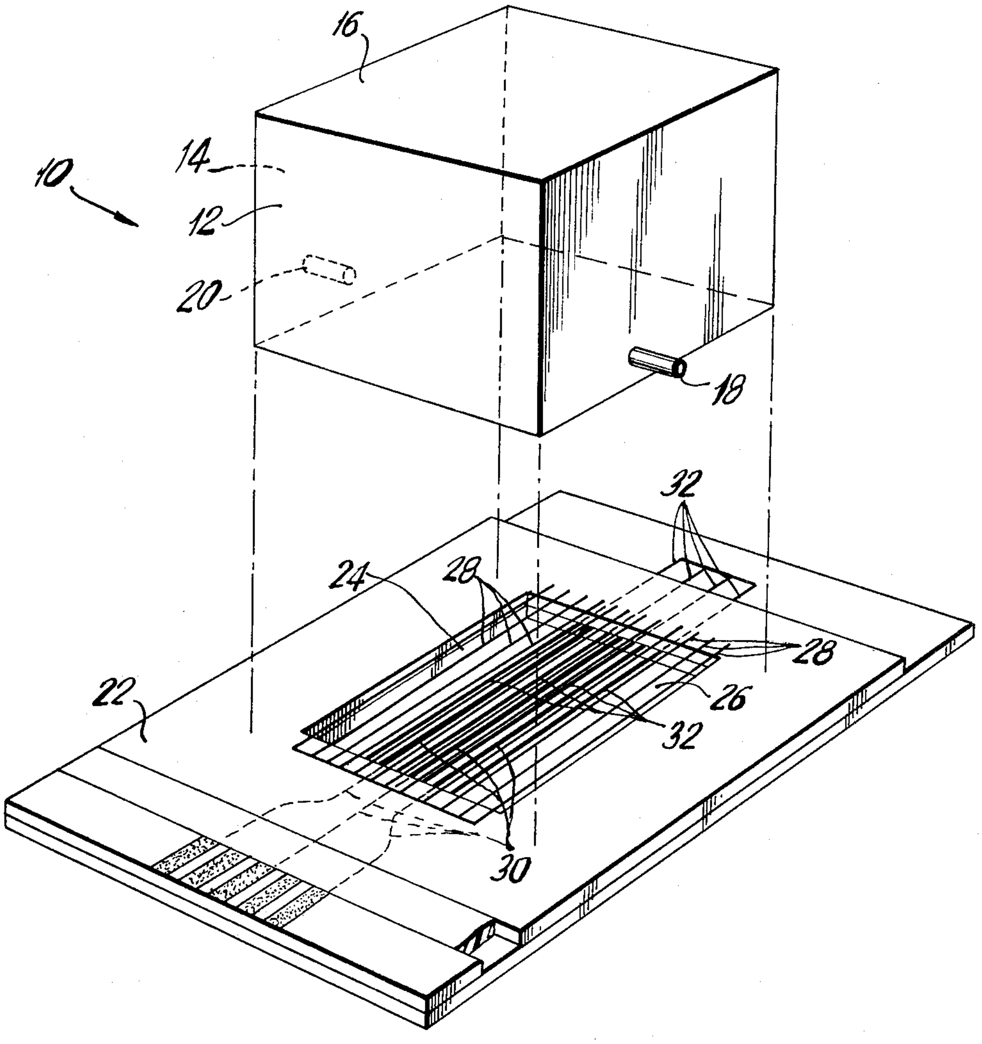
FIG. 1 is a perspective assembly view of an ionization chamber according to the present invention.

Referring to FIG. 1, the ionization chamber 10 of the present invention basically includes a tube or frame 12 defining a drift region 14 which is bounded by the walls of the tube 12, the tube being formed of a rigid, electrical insulative material such as fiber glass reinforced epoxy resin type G-10. A thin (10μ) aluminized-carbonized mylar foil 16 extends across the top of the tube 12, as viewed in FIG. 1, the foil 16 bounding the drift region 14 and serving as a field electrode when connected to a voltage source, as explained further below. Typical dimensions for the tube 12 are about 1.75 inches by 1.75 inches (4.45 cm. by 4.45 cm) in cross section and about 1.25 inches (3.18 cm.) in height, the wall thickness being about 0.125 inch (0.32 cm.) for the type G-10 epoxy resin.

A pair of gas inlet and outlet couplings 18,20 are provided on the sides of the tube 12 to enable a gas to be delivered into the drift region and evacuated therefrom, as desired. The couplins 18,20 are preferably made of glass having an inner diameter of about 1/16 inch (0.16 cm.).

The frame 12 is left open at its bottom, as viewed in FIG. 1, and is joined at its lower edges to another frame 22 having a central opening 24 therein, the frame 22 defining a detection region bounded by the sides of the opening 24, opening 24 is closed at the bottom of the frame 22 by an aluminized-carbonized mylar foil 26 which, like the foil 16 extending across the top of the detection region 14, is of a thickness of about 10 microns. The foil 26 serves as an electrode to confine the detection region, and is connected in a manner to be described.

A grid of closely spaced, parallel wires 28 extend across the top of the opening 24 in the detection field frame 22. The wires 28 are preferably of stainless steel with a diameter of about 20 microns, being spaced a distance from about 0.033 inch (0.85 mm.) from each other. The grid of wires 28 are connected to each other at one end of the frame 22, and serve to separate the drift region 14 within the frame 12 from the detection region within the opening 24 of the frame 22. Also, the grid wires 28 operate as a drift field electrode to provide a drift field when an external voltage source is connected to the foil electrode 16 and the grid wires 28.

As shown in FIG. 1, the detection field frame 22 is formed of a two-ply laminate of an electrical insulative material such as the fiberglass reinforced epoxy resin type G-10 of which the drift region frame 12 is made, each of these piles being typically about 0.063 inch (0.16 cm.) thick. Extending between plies of the frame 22 are a number of anode detection field wires 30 which are spaced apart and extend parallel to each other, each of the anode field wires 30 being arranged to extend parallel to and spaced apart from cathode field wires 32 so that a gap of about 0.05 inch (1.27 mm.) exists between adjacent anode and cathode field wires. The anode wires 30 are preferably gold-plated tungsten with a diameter of about 7 microns, and the cathode wires 32 are preferably of stainless steel with a diameter of about 100 microns. It will be understood from this construction that a thin gap of about 0.063 inch (1.59 mm.) is provided between the plane which includes the grid wires 28 and the plane which includes the anode and cathode field wires 30, 32.

Typical dimensions for the sides of the frame 22 are about 4 inches (10.16 cm.) by about 2.75 inches (6.99 cm.), the opening 24 through the frame 22 being dimensioned to substantially coincide with the bottom opening of the drift field frame 12.

The fine grid of wires 28 is an important feature of the present invention and, as far as is known, has not been employed in ionization chambers up to the present time. The spacing between wires 28 is less than 1 mm, this spacing having been chosen to be of the order of the spatial dimension to be resolved by the chamber 10, i.e., the mean distance between ionization clusters produced by a relativistic particle in the chamber. In place of the grid of wires 28, however, a wire mesh can be used as well for larger chambers where the narrow wire spacing is impractical because of the electrostatic forces, as long as openings are provided of the same order as the wire spacing.

Further, the detection region within the opening 24 of the frame 22 is effectively confined within a narrow gap which is less than 5 mm, this gap being defined by the plane including the grid of wires 28 and the plane of the bottom foil electrode 26. This gap for the detection region is smaller than in typical ionization chambers and has the effect of speeding up the anode signal and reducing the amount and the time of arrival of the primary ionization released in the gap. Incidentally, signals provided by this primary ionization (the first 40 nanoseconds) are preferably suppressed when making measurements with the chamber 10. The use of an anode wire of diameter less than 10 microns has been found to provide signals having extremely fast trailing edges so that with only slight differentiation, a base width of less than 20 nanoseconds can be obtained.

Figure 2:
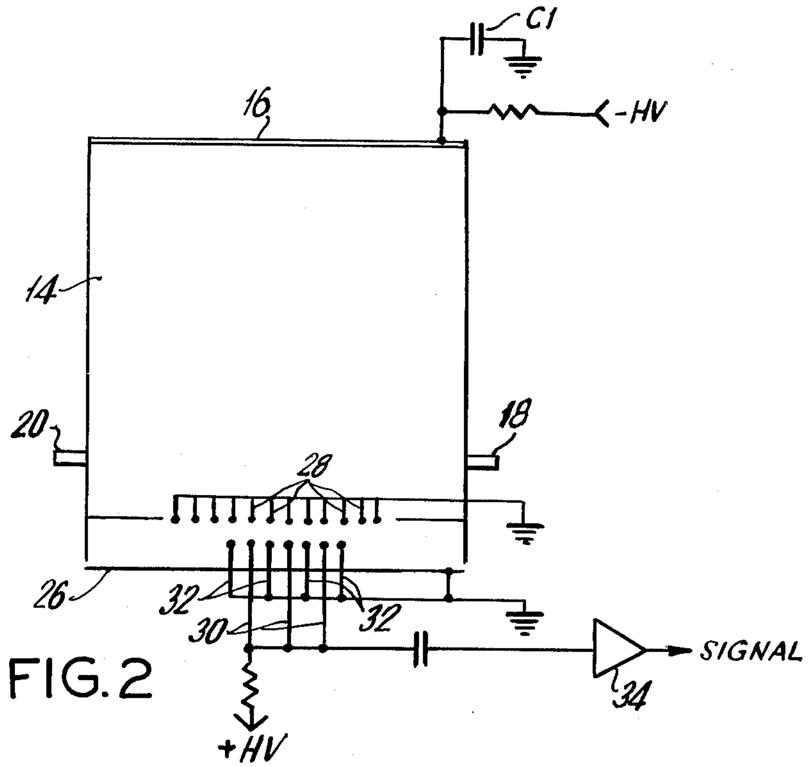
FIG. 2 is a schematic representation of the ionization chamber of FIG. 1 and associated components for providing output signals from the chamber.

FIG. 2 shows a typical arrangement for connecting the ionization chamber 10 with suitable voltage sources and electrical components such that output signals may be obtained when the chamber 10 is filled with a particular gas and relativistic particles enter the chamber, the radiation under investigation being brought into the detection or drift regions by a number of different means, depending upon the application. Such means (not shown) may include radiation through the bottom foil 26, radiation through a sealed window provided on the side of the drift frame 12, or the radiation may be included in the gas itself which is delivered to the chamber interior via the couplings 18,20 (FIG. 1). As shown in FIG. 2, the foil electrode 16 which forms an upper boundary for the drift region 14 is coupled to a negative high voltage supply through a high resistance which is typically about 5 megohms. The drift region electrode 16 is maintained at a negative potential relative to the grid of wires 28, this potential being typically between 10 to 50 volts when the chamber 10 is used in a diffusion mode, and between 100 to 500 volts when the cluster counting mode is used, the chamber 10 having the dimensions set out above. A capacitor C1, typically about 1 microfarad, is connected between the foil electrode 16 and ground potential. Inasmuch as the drift velocity of ionization clusters or electrons varies strongly with the electrical field strength, the corresponding drift velocity will vary strongly in different operating modes of the chamber. In the diffusion mode, the drift velocity is preferably between 0.18 cm per microsecond to 0.5 cm per microsecond, and in the cluster count mode the drift velocity is preferably between 0.5 cm per microsecond to 3.5 cm per microsecond.

The cathode field wires 32 in the detection region are connected to ground potential, and the anode field wires 30 are coupled to an external high voltage source through a resistance which is typically about 1.5 megohms. This positive high voltage source can typically range in values of from about 900 volts to 1080 volts, and thereby establish a detection field between the anode and cathode wires 30,32 so that the gas provided in the chamber 10 will operate in a proportional counting mode. The detection region field between the anode and cathode wires 30,32 can range from about 0.5 to 3 kilovolts per cm. Signals are obtained from the chamber 10 by coupling the anode wires 30 to a current amplifier 34 through a capacitance typically of about 470 picofarads. Amplifier 34 thereby amplifies signals developed by anode wire currents through the resistor, the equivalent noise charge of the amplifier 34 $\overline{(ECN)}$ being about $10^4 e_o$.

In accordance with the arrangement of FIG. 2, the ionization chamber 10 of the present invention provides a relative time expansion between anode wire signals representing the detection of ionization clusters passing at or near the anode wires over the mean time between signals provided by detected clusters in conventional proportional counters. This time expansion is achieved by providing a relatively weak drift region field and a relatively high detection region field so that the gases used provide a certain drift velocity for the clusters at a given field strength in the detection region close to the grid of wires 28, and a lower drift velocity within the weaker electric field provided in the drift region 14. The following table illustrates the ranges of field strengths for the drift region field so that the chamber 10 can be operated in either the cluster counting or diffusion mode for any of the three gases listed in the lefthand column. These measurements apply in the case where radiation enteres the chamber 10 through the bottom foil 26 in a direction parallel to the drift region field.

| Gas | $v_{max}$ for $E \geqq$ 2kV/cm | $E^{(1)}$ $V_{max/2}$ | $E^{(2)}$ $V^{(2)}$ | $v^{(3)}$ for $E^{(3)} = 0.01$ kV/cm |
|---|---|---|---|---|
| $CH_4$ | 10 cm/μs | 0.4 kV/cm<br>5 cm/μs | 0.08 kV/cm<br>1 cm/μs | 0.1 cm/μs |
| Ar—$CH_4$—$CH_2(OCH_3)_2$ | 7 cm/μs | 0.5 kV/cm<br>3.5 cm/μs | 0.1 kV/cm<br>0.5 cm/μs | 0.18 cm/μs |
| $H_2$ | 0.8 cm/μs | 1 kV/cm<br>0.4 cm/μs | 0.2 kV/cm<br>0.15 cm/μs | 0.04 cm/μs |

In the table:
$V_{max}$ is the drift velocity in the vicinity of the grid wires 28;
$E^{(1)}$ is the field strength where the drift velocity decreases to half its maxiumum value $V_{max}/2$;
$E^{(2)}$ is the field strength where the drift velocity $V^{(2)}$ is such that diffusion sets in (where the characteristic energy is $\epsilon n \approx 2\epsilon_{therm}$ with $\epsilon_{therm} = 1/40$ eV the thermal energy at 290° K.);
$V^{(3)}$ is the drift velocity for a very low drift region field of about 0.01 kV/cm.

From the above table, the range between $E^{(1)}$ and $E^{(2)}$ and correspondingly between $V^{(1)}$ to $V^{(2)}$ is the range for cluster counting, while $E^{(2)}$ to $E^{(3)}$ and $V^{(2)}$ to $V^{(3)}$ is the range for the diffusion mode of the chamber 10. For the cluster counting mode, it has been found that fields between 0.08 kV/cm and 1.0 kV/cm and drift velocities between 0.15 cm per microsecond and 1.0 cm per microsecond are useful. For the diffusion mode, ranges between 0.2 kV per centimeter to 0.01 kV per centimeter for the drift field, and 1 centimeter per microsecond down to 0.04 centimeter per microsecond for the drift velocity have been obtained.

It is further noted that the chamber 10 can be operated at different gas pressures, for example from 0.01 atmosphere to 10 atmospheres. The values for the electric fields in the drift region vary inversely with the gas pressure to obtain a particular drift velocity. For example, operating the chamber 10 at 0.1 atmosphere, the typical range for the drift region field strength in the cluster count mode would be $E^{(1)}$ ranging from 0.008 kV per centimeter to 0.1 kV per centimeter, instead of 0.08 kV per centimeter to 1.0 kV per centimeter as shown in the above table.

Figure 3:
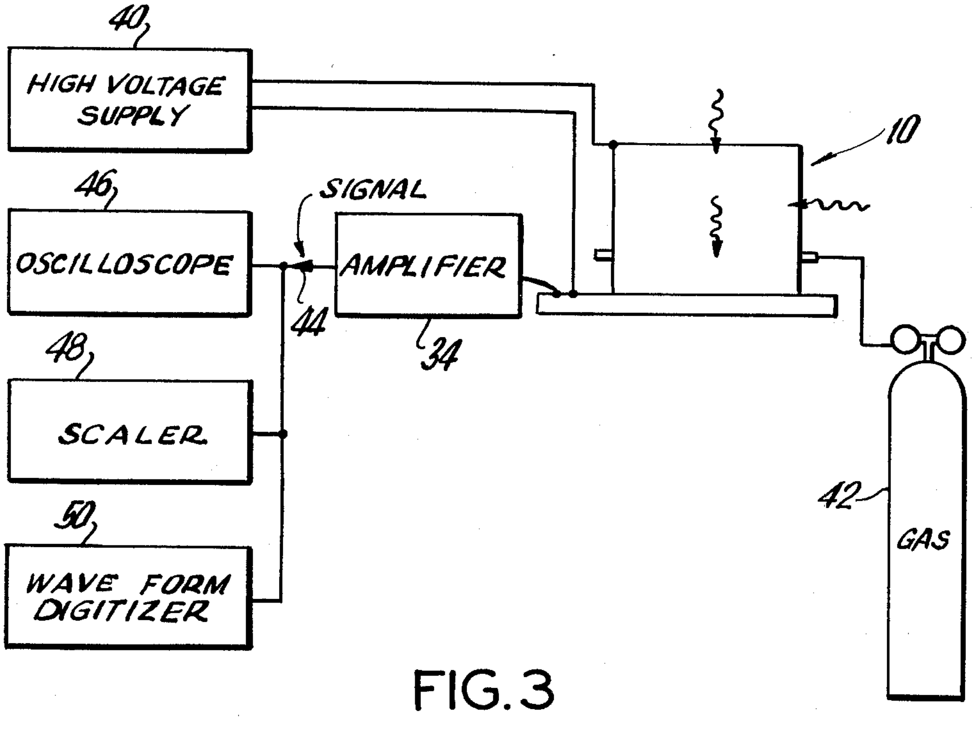
FIG. 3 is a schematic representation of a system including the ionization chamber for analyzing the signals provided by the chamber.

FIG. 3 represents a complete system for recording chamber measurements including the chamber 10, a high voltage supply 40, the supply 40 including both the negative and positive high voltage sources which are coupled to the drift and detection region electrodes, the current signal amplifier 34, and a source of gas which may be premixed within a pressure vessel 42 or supplied from a gas mixing system. The output pulse signal provided at 44 from the amplifier 34 is shown coupled to a pulse analyzing system including a storage oscilloscope 46, a scaler 48 (Jorway Model 1836, for example), and a waveform digitizer 50.

The ionization chamber 10 of the present invention represents a new tool suitable for extended study of the ionization process arising upon interaction of a fast particle with a gas, as well as for study of the drift process including the shape of the charge distribution parallel to the drift field, and drift velocity at very low fields.

The chamber 10 also provides a new tool for practical applications where very high position resolution (for particle trajectories perpendicular to the drift region field) or double track resolution is needed. Improved energy resolution for quanta can be obtained, since the fluctuation of gas gain is absent in the single electron counting mode. A considerable improvement in mass determination of relativistic particles is realized in the cluster counting mode.

The use of the chamber 10 in a diffusion mode wherein a very large time expansion can be obtained at low drift fields suggests the use of the chamber for the detection of low energy radiation ($E \leq 1$ keV) with good energy resolution including the advantages of higher speed signals, and the ability to provide position resolution with a large surface as compared to conventional semiconductor detectors.

Radiation including x-rays and electrons having an energy of about 1 keV releases about 30 single electrons in the chamber which may be detected and counted individually. With a Fano factor F of 0.2, an energy resolution of 19% FWHM could be expected since the statistical fluctuation of the proportional gas gain is eliminated.

The systematic study of Fano factors in gases is possible. If theoretical values $F \leqq 0.1$ and $W \approx 20$ eV can be verified (Penning mixtures), resolutions of 10% FWHM should be possible for 1 keV radiation.

Measurements performed with the ionization chamber 10 confirm that there is substantially no loss of ionization energy produced by a fast particle when it is introduced into the chamber at the end of the drift field opposite the detection field, or at the grid of wires 28, compared to the case when the particle is introduced directly into the detection region. For example, soft x-rays from a $^{55}Fe$ source were directed into the detection region, and a signal of about 20 nanosecond base width was obtained. The same radiation absorbed at the far end of the drift region, with a drift field of about 0.5 kV/cm, provided a signal of about 40 nanosecond base width and about ½ the amplitude of the first signal. Inasmuch as any ionization loss would be evident from a direct comparison of the integrated signals, this measurement shows substantially no loss in energy taking place when radiation is directed toward the far end of the drift region. It has also been found that even for a much smaller drift field of 10 volts per centimeter, for example, no substantial losses occur, the anode signal decomposing into a number of single peaks at the lower drift field intensity, some of the peaks possibly being attributable to single electrons. Further, even at very low drift fields, the spread of a signal provided by an ionization cluster remains small compared to the mean distance of subsequent clusters.

While specific embodiments of the invention have been shown and described in detail to illustrate the application of the inventive principles, it will be understood that the invention may be embodied otherwise without departing from such principles.

What is claimed is:

1. An ionization chamber adapted to provide high resolution output signals corresponding to detected ionization clusters or single electrons produced by a relativistic particle therein comprising a first member for surrounding a drift region, a second member for surrounding a detection region, a grid element defining a first electrode for separating said drift and detection regions, said grid element having a construction related to successive clusters to be detected, a second electrode located in said drift region and spaced apart from said grid to enable a drift field to be provided in said drift region when said first and second electrodes are connected to a first external voltage source, and spaced apart anode and cathode field electrodes in said detecting region for providing a detecting field between said field electrodes in said detecting region when said field electrodes are connected to a second external voltage source.

2. An ionization chamber as defined in claim 1, wherein said grid element comprises a number of coplanar parallel wires spaced apart from each other by an amount corresponding to the mean distance between successive clusters to be detected.

3. An ionization chamber as defined in claim 2, wherein said grid wires are spaced apart by a distance which is less than about 1.0 mm.

4. An ionization chamber as defined in claim 1, wherein said anode field electrode comprises a wire having a diameter which is less than about 10 microns.

5. An ionization chamber as defined in claim 2, further including a planar electrode mounted to said second member and extending parallel to the plane of said grid thereby defining a detection field gap between said grid and said planar electrode.

6. An ionization chamber as defined in claim 5, wherein said gap extends over a distance which is less than about 5.0 mm.

7. An ionization chamber as defined in claim 2, wherein said second electrode extends in a plane which is parallel to the plane of said grid.

8. An ionization chamber as defined in claim 2, wherein said anode and cathode field electrodes comprise wires which extend parallel to each other in a plane parallel to the plane of said grid and are spaced apart from each other by a distance which is less than about 1.5 mm.

9. A method of obtaining high resolution pulse signals corresponding to detected ionization clusters or single electrons produced by ionizing radiation comprising the steps of arranging an ionization chamber with a drift field region and a detection field region, separating said drift and detection field regions with a grid element having a construction related to successive clusters to be detected and arranging said grid wires to be connected as a first electrode, providing a second electrode in said drift region and spacing it from said grid to enable a drift field to be provided in said drift region when said first and second electrodes are connected to a first voltage source, providing anode and cathode field electrodes in said detecting region and spacing them apart from each other to enable a detecting field to be provided between said field electrodes in said detecting region when said field electrodes are connected to a second voltage source, supplying said drift and detection regions with an ionizing gas capable of operating in a proportional mode, applying a first voltage across said first and second electrodes to provide a drift field in said drift region and adjusting said first voltage so that said drift field is below the level at which said gas operates in said proportional mode, applying a second voltage across said anode and cathode field electrodes and adjusting said voltage so that said detecting field is at a level at which said gas operates in said proportional mode, and arranging said field electrodes to provide said pulse signals.

10. The method of claim 9, wherein said first voltage is adjusted so that said drift field is in the range of from 10 volts per cm. to 1,000 volts per cm, and said second voltage is adjusted so that said detection field is greater than about 2,000 volts per cm when said gas is at substantially atmospheric pressure.

11. The method of claim 9, further including the step of allowing ionizing radiation to enter said chamber through said detection region in a direction parallel to said drift field.

12. The method of claim 9, further including the step of allowing ionizing radiation to enter said chamber through said drift region in a direction perpendicular to said drift field.

13. The method of claim 9, further including the step of allowing ionizing radiation to enter said chamber by including said particle in said gas.

14. The method of claim 9, including arranging said grid element in the form of a number of wires extending parallel to each other in a given plane, and spacing said grid wires by an amount corresponding to the mean distance between successive clusters to be detected.

* * * * *